United States Patent
Inamoto

(10) Patent No.: US 9,744,998 B2
(45) Date of Patent: Aug. 29, 2017

(54) VEHICLE BODY REINFORCING STRUCTURE

(71) Applicant: TOYOTA JIDOSHA KABUSHIKI KAISHA, Toyota-shi (JP)

(72) Inventor: Yoshiteru Inamoto, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 1 day.

(21) Appl. No.: 14/912,225

(22) PCT Filed: Aug. 11, 2014

(86) PCT No.: PCT/JP2014/071240
§ 371 (c)(1),
(2) Date: Feb. 16, 2016

(87) PCT Pub. No.: WO2015/045657
PCT Pub. Date: Apr. 2, 2015

(65) Prior Publication Data
US 2016/0200371 A1 Jul. 14, 2016

(30) Foreign Application Priority Data
Sep. 27, 2013 (JP) .................................. 2013-202606

(51) Int. Cl.
*B62D 29/00* (2006.01)
*B62D 25/04* (2006.01)
(Continued)

(52) U.S. Cl.
CPC ............. *B62D 25/04* (2013.01); *B62D 21/15* (2013.01); *B62D 24/00* (2013.01); *B62D 25/025* (2013.01); *B62D 29/005* (2013.01)

(58) Field of Classification Search
CPC ..... B62D 25/04; B62D 25/025; B62D 29/005
(Continued)

(56) References Cited

U.S. PATENT DOCUMENTS 5,888,600 A * 3/1999 Wycech .................. B29C 44/12
428/35.9
5,992,923 A * 11/1999 Wycech ............... B62D 29/002
280/805
(Continued)

FOREIGN PATENT DOCUMENTS

CN 103085293 A 5/2013
JP 2009-35045 A 2/2009

OTHER PUBLICATIONS

International Search Report issued Oct. 7, 2014 in PCT/JP2014/071240 filed Aug. 11, 2014.

*Primary Examiner* — Jason S Morrow
(74) *Attorney, Agent, or Firm* — Oblon, McClelland, Maier & Neustadt, L.L.P.

(57) ABSTRACT

A first reinforcing reinforcement that is formed of a fiber reinforced resin material is continuously superposed with and adhered to an inner wall surface of a front wall portion, an inner wall surface of an outer wall portion, and an inner wall surface of a rear wall portion of an outer reinforcement. A pair of superposed portions of a second reinforcing reinforcement are superposed, via the first reinforcing reinforcement, with the inner wall surface of the front wall portion and the inner wall surface of the rear wall portion of the outer reinforcement. The second reinforcing reinforcement is directly joined to the front wall portion and the rear wall portion of the outer reinforcement, and the pair of superposed portions are connected by a connecting portion.

4 Claims, 9 Drawing Sheets

(51) Int. Cl.
    *B62D 21/15*     (2006.01)
    *B62D 24/00*     (2006.01)
    *B62D 25/02*     (2006.01)

(58) Field of Classification Search
    USPC ................................ 296/203.01, 209, 193.06
    See application file for complete search history.

(56) References Cited

U.S. PATENT DOCUMENTS

| | | | | |
|---|---|---|---|---|
| 6,003,274 | A * | 12/1999 | Wycech | B29C 44/18 |
| | | | | 296/187.02 |
| 6,270,600 | B1 * | 8/2001 | Wycech | B29C 44/12 |
| | | | | 156/79 |
| 2013/0106138 | A1 * | 5/2013 | Brockhoff | B29C 70/028 |
| | | | | 296/187.03 |
| 2015/0197289 | A1 * | 7/2015 | Kurokawa | B62D 29/005 |
| | | | | 296/187.08 |
| 2016/0325701 | A1 * | 11/2016 | Yabu | B60R 19/03 |
| 2017/0036701 | A1 * | 2/2017 | Yamada | B62D 25/04 |

* cited by examiner

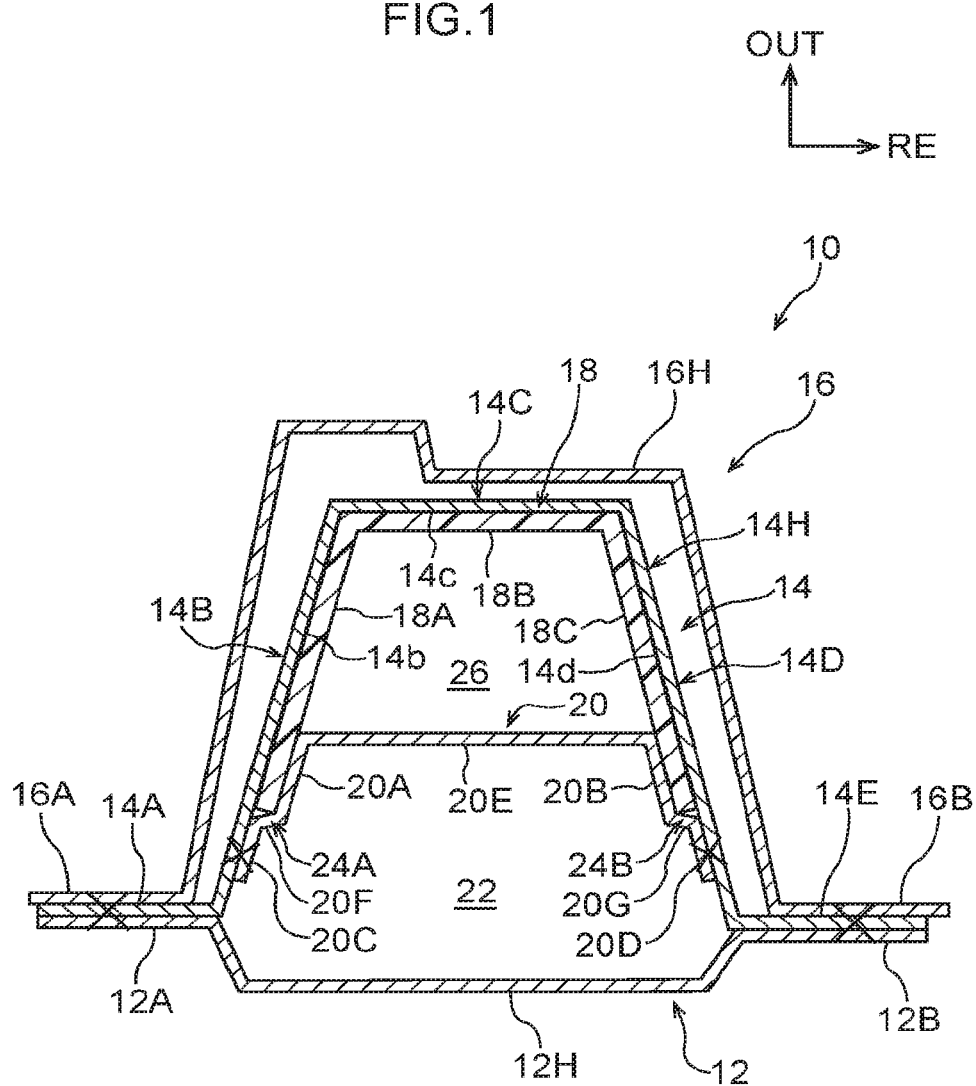

VEHICLE BODY REINFORCING STRUCTURE

TECHNICAL FIELD

The present invention relates to a vehicle body reinforcing structure.

BACKGROUND ART

There are cases in which, in a vehicle, a plate member formed of a fiber reinforced resin material is used in order to devise lightening of the weight of the vehicle body, and this plate member is adhered to a metal plate (see, for example, Patent Document 1).

PRIOR ART DOCUMENTS

Patent Document

Patent Document 1: Japanese Patent Application Laid-Open (JP-A) No. 2009-35045

SUMMARY OF INVENTION

Technical Problem

By the way, there are cases in which a plate member that is formed of a fiber reinforced resin material is adhered for reinforcement to a metal plate that forms a portion of a vehicle body. However, in such a structure, at the time of input of load at the time of a collision or the like, if the plate member that is for reinforcement does not follow the deformation of the metal plate, the input load cannot be transmitted effectively to the plate member for reinforcement.

In view of the above-described circumstances, an object of the present invention is to obtain a vehicle body reinforcing structure that, in a case in which load is inputted to a vehicle body structural member that is made of metal, can effectively transmit the input load to a reinforcing member that is formed from a fiber reinforced resin material.

Solution to Problem

A vehicle body reinforcing structure relating to a first aspect of the present invention comprises: a vehicle body structural member that is made of metal, the vehicle body structural member having a first wall portion, and a pair of second wall portions that are bent from both end portions of the first wall portion and extend-out toward sides facing one another; a first reinforcing member that is bent-plate-shaped, the first reinforcing member being disposed at an inner side of the vehicle body structural member, the first reinforcing member being formed integrally of a fiber reinforced resin material, and the first reinforcing member being continuously superposed with and adhered to at least two inner wall surfaces that are continuous at the vehicle body structural member; and a second reinforcing member that has a pair of superposed portions, a pair of mounting portions, and a connecting portion, the pair of superposed portions being disposed at the inner side of the vehicle body structural member and superposed, via the first reinforcing member, with end wall surfaces that configure both end sides of the at least two inner wall surfaces that are continuous, the pair of mounting portions being connected in the forms of steps to the superposed portions and directly joined to wall portions that configure the end wall surfaces, and the connecting portion connecting end portions, at sides opposite the mounting portion sides, of the pair of superposed portions.

In accordance with the above-described structure, at the vehicle body structural member that is made of metal, the pair of second wall portions are bent from the both end portions of the first wall portion, and extend-out toward sides of facing one another. The first reinforcing member, that is bent-plate-shaped and is formed integrally of a fiber reinforced resin material, is disposed at the inner side of the vehicle body structural member. This first reinforcing member is continuously superposed with and adhered to at least two inner wall surfaces that are continuous at the vehicle body structural member. Therefore, the vehicle body structural member is reinforced by the first reinforcing member.

Further, the second reinforcing member is disposed at the inner side of the vehicle body structural member, and the second reinforcing member has the pair of superposed portions, the mounting portions, and the connecting portion. The pair of superposed portions are superposed, via the first reinforcing member, with the end wall surfaces that configure the both end sides of the at least two inner wall surfaces that are continuous. Further, the pair of mounting portions are connected in the forms of steps to the superposed portions, and are directly joined to the wall portions that configure the end wall surfaces. The connecting portion connects the end portions, that are at the sides opposite the mounting portion sides, of the pair of superposed portions. In this way, the first reinforcing member is nipped between the second reinforcing member and the wall portions of the vehicle body structural member, while the both end sides of the second reinforcing member are directly joined to the wall portions that configure the end wall surfaces of the vehicle body structural member. Therefore, for example, even if the wall portions of the vehicle body structural member deform due to load input, the first reinforcing member can be made to follow the deformation of the wall portions of the vehicle body structural member.

In a second aspect of the present invention, in the vehicle body reinforcing structure relating to the first aspect, the second reinforcing member is bent in shapes of cranks along step portions, the step portions being formed between regions where the first reinforcing member is superposed with the end wall surfaces and regions where the first reinforcing member is not superposed with the end wall surfaces.

In accordance with the above-described structure, the second reinforcing member is bent in the shapes of cranks along step portions that are formed by the first reinforcing member and the end wall surfaces of the vehicle body structural member. Therefore, the mounting portions of the second reinforcing member are supported by the vehicle body structural member at positions adjacent to the final end portions of the first reinforcing member. Accordingly, the holding force by which the second reinforcing member holds the final end portions of the first reinforcing member is increased, and, at the time of input of load to the vehicle body structural member, the final end portions of the first reinforcing member can more stably be made to follow the deformation of the wall portions that configure the end wall surfaces of the vehicle body structural member.

In the third aspect of the present invention, in the vehicle body reinforcing structure relating to the first aspect or the second aspect, the first reinforcing member is continuously superposed with and adhered to three inner wall surfaces that are continuous at the vehicle body structural member, and the connecting portion spans in a rectilinear form between the end portions, at the sides opposite the mounting portion sides, of the pair of superposed portions, and forms a closed cross-section together with the first reinforcing member.

In accordance with the above-described structure, the first reinforcing member is continuously superposed with and adhered to three inner wall surfaces that are continuous at the vehicle body structural member, and the connecting portion spans in a rectilinear form between the end portions, at the sides that are opposite the mounting portion sides, of the pair of superposed portions. Therefore, at the time of input of load to the vehicle body structural member, in a case in which the pair of second wall portions of the vehicle body structural member deform, the first reinforcing member is held between the second reinforcing member and the second wall portions of the vehicle body structural member, also due to the tensed support of the connecting portion of the second reinforcing member. Accordingly, the first reinforcing member can more stably be made to follow deformation of the second wall portions of the vehicle body structural member. Further, because the connecting portion, together with the first reinforcing member, forms a closed cross-section, cross-sectional deformation of the vehicle body structural member at the time of input of load to the vehicle body structural member is effectively suppressed. Due thereto, deformation amounts of the pair of second wall portions of the vehicle body structural member also are suppressed, and therefore, the first reinforcing member following the deformation of the second wall portions becomes easy.

In a fourth aspect of the present invention, in the vehicle body reinforcing structure relating to the first aspect or the second aspect, the first reinforcing member is continuously superposed with and adhered to three inner wall surfaces that are continuous at the vehicle body structural member, and the connecting portion has a mating portion that is superposed, via the first reinforcing member, with the inner wall surface of the first wall portion.

In accordance with the above-described structure, the first reinforcing member is continuously superposed with and adhered to three inner wall surfaces that are continuous at the vehicle body structural member, and the mating portion at the connecting portion of the second reinforcing member is superposed with the inner wall surface of the first wall portion via the first reinforcing member. In this way, because the first reinforcing member is nipped also between the first wall portion of the vehicle body structural member and the mating portion of the second reinforcing member, at the time of input of load to the vehicle body structural member, the first reinforcing member can stably be made to follow the deformation of the first wall portion of the vehicle body structural member.

Advantageous Effects of Invention

As described above, in accordance with the vehicle body reinforcing structure relating to the first aspect of the present invention, there is the excellent effect that, in a case in which load is inputted to the vehicle body structural member that is made of metal, the input load can be effectively transmitted to the first reinforcing member that is formed of a fiber reinforced resin material.

In accordance with the vehicle body reinforcing structure relating to the second aspect of the present invention, there is the excellent effect that, by improving the ability of the final end portions of the first reinforcing member to follow the deformation of the vehicle body structural member, the performance of transmitting load to the first reinforcing member in a case in which load is inputted to the vehicle body structural member can be improved more.

In accordance with the vehicle body reinforcing structure relating to the third aspect of the present invention, there is the excellent effect that, by improving the ability of the first reinforcing member to follow the deformation of the pair of second wall portions of the vehicle body structural member, the performance of transmitting load to the first reinforcing member in a case in which load is inputted to the vehicle body structural member can be improved more.

In accordance with the vehicle body reinforcing structure relating to the fourth aspect of the present invention, there is the excellent effect that, by improving the ability of the first reinforcing member to follow the deformation of the first wall portion of the vehicle body structural member, the performance of transmitting load to the first reinforcing member in a case in which load is inputted to the vehicle body structural member can be improved more.

BRIEF DESCRIPTION OF DRAWINGS

FIG. 1 is a horizontal sectional view showing a center pillar to which a vehicle body reinforcing structure relating to a first embodiment of the present invention is applied.

DESCRIPTION OF EMBODIMENTS

Figure 2A:
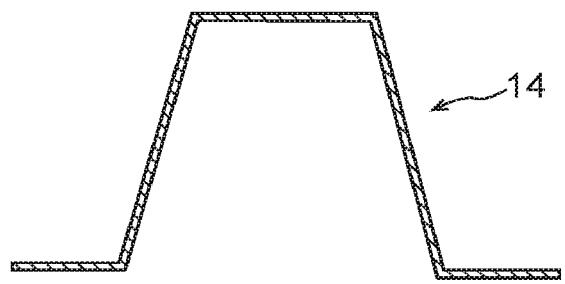
FIG. 2A is a process diagram showing one step of a method of manufacturing the center pillar of FIG. 1 (a step in which a single part that is an outer reinforcement is molded).

[First Embodiment]
A vehicle body reinforcing structure relating to a first embodiment of the present invention is described by using FIG. 1 through FIG. 4. Note that, in FIG. 1, arrow RE indicates the vehicle rear side, and arrow OUT indicates the vehicle transverse direction outer side.

A center pillar 10, to which the vehicle body reinforcing structure relating to the present embodiment is applied, is shown in a horizontal sectional view in FIG. 1. As shown in this drawings, the center pillar 10 has an inner panel 12 that is made of metal (made of steel in the present embodiment) and that configures the region at the vehicle transverse direction inner side of the center pillar 10. As seen in a horizontal sectional view, the inner panel 12 is formed in the shape of a hat that opens toward the vehicle transverse direction outer side, and has a main body portion 12H that, as seen in a horizontal sectional view, is substantially U-shaped and opens toward the vehicle transverse direction outer side. A front flange portion 12A, that is bent and extends-out toward the vehicle front side, is formed from the vehicle front side open end of the main body portion 12H. A rear flange portion 12B, that is bent and extends-out toward the vehicle rear side, is formed from the vehicle rear side open end of the main body portion 12H.

Further, the center pillar 10 has an outer reinforcement 14 that serves as a vehicle body structural member, and is made of metal (is made of steel in the present embodiment), and that, together with the inner panel 12, forms a closed cross-section 22. As seen in a horizontal sectional view, the outer reinforcement 14 is formed in the shape of a hat that opens toward the vehicle transverse direction inner side, and has a main body portion 14H that, as seen in a horizontal sectional view, is substantially U-shaped and opens toward the vehicle transverse direction inner side.

The main body portion 14H has an outer wall portion 14C that serves as a first wall portion and configures the region at the vehicle transverse direction outer side. The surfaces of the outer wall portion 14C face in the vehicle transverse direction, and a front wall portion 14B and a rear wall portion 14D, that serve as a pair of front and rear second wall portions and that are bent and extend-out toward sides of facing one another, are formed from the both vehicle longitudinal direction end portions of the outer wall portion 14C. The front wall portion 14B is inclined slightly toward the vehicle front side while heading toward the vehicle transverse direction inner side, and the rear wall portion 14D is inclined slightly toward the vehicle rear side while heading toward the vehicle transverse direction inner side.

A front flange portion 14A, that is bent and extends-out toward the vehicle front side, is formed from the vehicle transverse direction inner side end portion of the front wall portion 14B of the main body portion 14H. Further, a rear flange portion 14E, that is bent and extends-out toward the vehicle rear side, is formed from the vehicle transverse direction inner side end portion of the rear wall portion 14D of the main body portion 14H.

Further, the center pillar 10 has a side outer panel 16 (also called a "side member outer") that is made of metal (is made of steel in the present embodiment) and is disposed at the vehicle transverse direction outer side of the outer reinforcement 14. The side outer panel 16 has a bulging portion 16H that covers the main body portion 14H of the outer reinforcement 14 from the vehicle transverse direction outer side. As seen in a horizontal sectional view, the bulging portion 16H bulges out toward the vehicle transverse direction outer side and opens toward the vehicle transverse direction inner side. A front flange portion 16A, that is bent and extends-out toward the vehicle front side, is formed from the vehicle front side open end of the bulging portion 16H. A rear flange portion 16B, that is bent and extends-out toward the vehicle rear side, is formed from the vehicle rear side open end of the bulging portion 16H.

The front flange portion 12A of the inner panel 12, the front flange portion 14A of the outer reinforcement 14, and the front flange portion 16A of the side outer panel 16 are spot welded in a state of being superposed in three layers. Further, the rear flange portion 12B of the inner panel 12, the rear flange portion 14E of the outer reinforcement 14, and the rear flange portion 16B of the side outer panel 16 also are spot welded in a state of being superposed in three layers in the same way. Due thereto, the three members that are the inner panel 12, the outer reinforcement 14, and the side outer panel 16 are made integral.

A first reinforcing reinforcement 18 that serves as a first reinforcing member is disposed at the inner side of the main body portion 14H of the outer reinforcement 14. The first reinforcing reinforcement 18 is a member that is shaped as a bent plate, and is formed integrally of a fiber reinforced resin material. Note that a fiber reinforced resin material is a composite material (FRP) that is formed by fibers (e.g., carbon fibers) being solidified in resin, and is light-weight and has high specific strength. The first reinforcing reinforcement 18 is continuously superposed with and adhered to an inner wall surface 14b (vehicle rear side surface) of the front wall portion 14B of the outer reinforcement 14, an inner wall surface 14c (vehicle transverse direction inner side surface) of the outer wall portion 14C, and an inner wall surface 14d (vehicle front side surface) of the rear wall portion 14D. In other words, in the present embodiment, the inner wall surface 14b of the front wall portion 14B and the inner wall surface 14d of the rear wall portion 14D of the outer reinforcement 14 correspond to end wall surfaces that configure the both end sides of the three continuous inner wall surfaces 14b, 14c, 14d at the outer reinforcement 14 that are superposed by the first reinforcing reinforcement 18.

The first reinforcing reinforcement 18 has an outer wall reinforcing portion 18B that configures the region at the vehicle transverse direction outer side. The outer wall reinforcing portion 18B is adhered to the inner wall surface 14c of the outer wall portion 14C of the outer reinforcement 14 in a planarly-contacting state.

Further, the first reinforcing reinforcement 18 has a front wall reinforcing portion 18A that is bent from the vehicle front side end portion of the outer wall reinforcing portion 18B and extends-out obliquely toward the vehicle transverse direction inner side and front side. The front wall reinforcing portion 18A is adhered to the inner wall surface 14b of the front wall portion 14B of the outer reinforcement 14 in a planarly-contacting state, and, as seen in the sectional view of FIG. 1, is superposed with a range that excludes the vehicle transverse direction inner side end portion at the inner wall surface 14*b* of the front wall portion 14B. Therefore, a step portion 24A is formed between a region where the first reinforcing reinforcement 18 (the front wall reinforcing portion 18A) is superposed with the inner wall surface 14*b* of the front wall portion 14B of the outer reinforcement 14, and a region where the first reinforcing reinforcement 18 is not superposed with the inner wall surface 14*b* of the front wall portion 14B of the outer reinforcement 14.

Moreover, the first reinforcing reinforcement 18 has a rear wall reinforcing portion 18C that is bent from the vehicle rear side end portion of the outer wall reinforcing portion 18B and extends-out obliquely toward the vehicle transverse direction inner side and rear side. The rear wall reinforcing portion 18C is adhered to the inner wall surface 14*d* of the rear wall portion 14D of the outer reinforcement 14 in a planarly-contacting state, and, as seen in the sectional view of FIG. 1, is superposed with a range that excludes the vehicle transverse direction inner side end portion at the inner wall surface 14*d* of the rear wall portion 14D. Therefore, a step portion 24B is formed between a region where the first reinforcing reinforcement 18 (the rear wall reinforcing portion 18C) is superposed with the inner wall surface 14*d* of the rear wall portion 14D of the outer reinforcement 14, and a region where the first reinforcing reinforcement 18 is not superposed with the inner wall surface 14*d* of the rear wall portion 14D of the outer reinforcement 14.

On the other hand, a second reinforcing reinforcement 20 that serves as a second reinforcing member is disposed at the inner side of the main body portion 14H of the outer reinforcement 14, in addition to the first reinforcing reinforcement 18. The second reinforcing reinforcement 20 is for preventing peeling-apart of the first reinforcing reinforcement 18, and has a pair of front and rear superposed portions 20A, 20B that are superposed with the outer reinforcement 14 via the first reinforcing reinforcement 18.

The superposed portion 20A that is at the front side in the vehicle longitudinal direction is superposed, via the front wall reinforcing portion 18A of the first reinforcing reinforcement 18, with a region toward the vehicle transverse direction inner side at the inner wall surface 14*b* of the front wall portion 14B of the outer reinforcement 14. This superposed portion 20A is superposed with and adhered to the vehicle transverse direction inner side end portion of the front wall reinforcing portion 18A. Further, the superposed portion 20B that is at the rear side in the vehicle longitudinal direction is superposed, via the rear wall reinforcing portion 18C of the first reinforcing reinforcement 18, with a region toward the vehicle transverse direction inner side at the inner wall surface 14*d* of the rear wall portion 14D of the outer reinforcement 14. This superposed portion 20B is superposed with and adhered to the vehicle transverse direction inner side end portion of the rear wall reinforcing portion 18C.

The region at the vehicle longitudinal direction front side of the second reinforcing reinforcement 20 is bent in the shape of a crank along the step portion 24A, and has a mounting portion 20C that is connected in the form of a step with the superposed portion 20A of the vehicle longitudinal direction front side. The mounting portion 20C is directly superposed with the inner wall surface 14*b* of the front wall portion 14B of the outer reinforcement 14, and is joined by spot welding to the front wall portion 14B of the outer reinforcement 14. The vehicle transverse direction inner side end portion of the superposed portion 20A and the vehicle transverse direction outer side end portion of the mounting portion 20C are connected by an inclined wall portion 20F that is slightly inclined toward the vehicle transverse direction inner side while heading toward the vehicle front side.

The region at the vehicle longitudinal direction rear side of the second reinforcing reinforcement 20 also is similarly bent in the shape of a crank along the step portion 24B, and has a mounting portion 20D that is connected in the form of a step with the superposed portion 20B of the vehicle longitudinal direction rear side. The mounting portion 20D is directly superposed with the inner wall surface 14*d* of the rear wall portion 14D of the outer reinforcement 14, and is joined by spot welding to the rear wall portion 14D of the outer reinforcement 14. The vehicle transverse direction inner side end portion of the superposed portion 20B and the vehicle transverse direction outer side end portion of the mounting portion 20D are connected by an inclined wall portion 20G that is slightly inclined toward the vehicle transverse direction inner side while heading toward the vehicle rear side.

Further, the second reinforcing reinforcement 20 has a connecting portion 20E that connects the end portion at the vehicle transverse direction outer side (i.e., the side opposite the mounting portion 20C side) of the superposed portion 20A that is at the vehicle longitudinal direction front side, and the end portion at the vehicle transverse direction outer side (i.e., the side opposite the mounting portion 20D side) of the superposed portion 20B that is at the vehicle longitudinal direction rear side. The connecting portion 20E rectilinearly spans in the vehicle longitudinal direction between the end portions at the vehicle transverse direction outer sides (i.e., the sides opposite the mounting portion 20C, 20D sides) of the pair of superposed portions 20A, 20B, and, together with the first reinforcing reinforcement 18, forms a closed cross-section 26.

This connecting portion 20E is disposed parallel to the outer wall portion 14C of the outer reinforcement 14 and the outer wall reinforcing portion 18B of the first reinforcing reinforcement 18. The connecting portion 20E applies tensed force, that runs along the vehicle longitudinal direction, between the respective vehicle transverse direction inner side end portions of the front wall reinforcing portion 18A and the rear wall reinforcing portion 18C of the first reinforcing reinforcement 18. Namely, the connecting portion 20E nips the vehicle transverse direction inner side end portion of the front wall reinforcing portion 18A of the first reinforcing reinforcement 18 in between the connecting portion 20E and the front wall portion 14B of the outer reinforcement 14, and nips the vehicle transverse direction inner side end portion of the rear wall reinforcing portion 18C of the first reinforcing reinforcement 18 in between the connecting portion 20E and the rear wall portion 14D of the outer reinforcement 14.

Figure 2B:
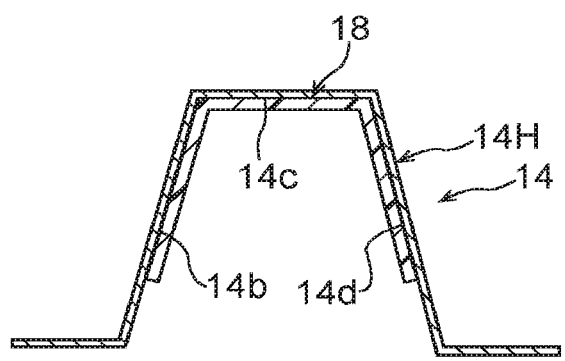
FIG. 2B is a process diagram showing one step of the method of manufacturing the center pillar of FIG. 1 (a step in which a first reinforcing reinforcement is molded and is adhered to the outer reinforcement).

The above-described center pillar 10 is manufactured by the following processes. First, a single part that is the outer reinforcement 14 shown in FIG. 2A is molded. Next, as shown in FIG. 2B, the first reinforcing reinforcement 18 is molded and is adhered to the outer reinforcement 14, due to pressurization and heating being carried out in a state in which the base material of the first reinforcing reinforcement 18 is affixed to the inner wall surfaces 14*b*, 14*c*, 14*d* of the main body portion 14H of the outer reinforcement 14.

Figure 2C:
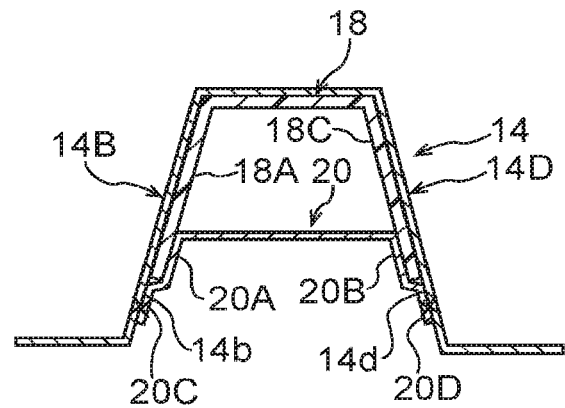
FIG. 2C is a process diagram showing one step of the method of manufacturing the center pillar of FIG. 1 (a step in which superposed portions of a second reinforcing reinforcement are adhered to the first reinforcing reinforcement, and mounting portions of the second reinforcing reinforcement are welded to the outer reinforcement).
Figure 2D:
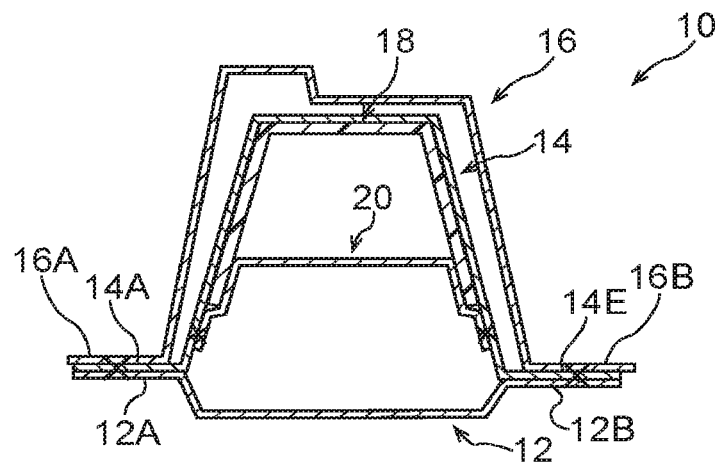
FIG. 2D is a process diagram showing one step of the method of manufacturing the center pillar of FIG. 1 (a step in which flange portions of an inner panel, flange portions of the outer reinforcement, and flange portions of a side outer panel are superposed as three layers and welded).

Next, as shown in FIG. 2C, the superposed portion 20A of the second reinforcing reinforcement 20 is adhered to the inner wall end portion of the front wall reinforcing portion 18A of the first reinforcing reinforcement 18, and the superposed portion 20B of the second reinforcing reinforcement 20 is adhered to the inner wall end portion of the rear wall reinforcing portion 18C of the first reinforcing reinforcement 18. Note that the second reinforcing reinforcement 20 is molded as a single part before the process shown in FIG. 2C. Further, the mounting portion 20C of the second reinforcing reinforcement 20 is joined by spot welding to the inner wall surface 14b of the front wall portion 14B of the outer reinforcement 14, and the mounting portion 20D of the second reinforcing reinforcement 20 is joined by spot welding to the inner wall surface 14d of the rear wall portion 14D of the outer reinforcement 14. Further, finally, as shown in FIG. 2D, the front flange portion 12A of the inner panel 12, the front flange portion 14A of the outer reinforcement 14, and the front flange portion 16A of the side outer panel 16 are spot welded in a state of being superposed in three layers, and the rear flange portion 12B of the inner panel 12, the rear flange portion 14E of the outer reinforcement 14, and the rear flange portion 16B of the side outer panel 16 are spot welded in a state of being superposed in three layers. Due thereto, the assembly of the center pillar 10 is manufactured.

Figure 3A:
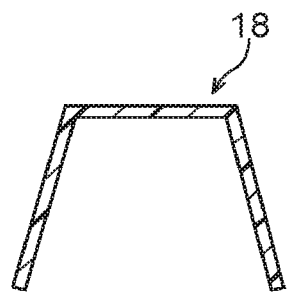
FIG. 3A is a process diagram showing one step of another method of manufacturing the center pillar of FIG. 1 (a step in which the first reinforcing reinforcement is molded as a single part).
Figure 3B:
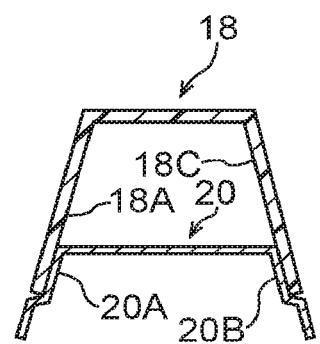
FIG. 3B is a process diagram showing one step of the other method of manufacturing the center pillar of FIG. 1 (a step in which the superposed portions of the second reinforcing reinforcement are adhered to the first reinforcing reinforcement).

Note that the center pillar 10 may be manufactured by the following processes. First, as shown in FIG. 3A, the first reinforcing reinforcement 18 is molded as a single part. Next, as shown in FIG. 3B, the superposed portion 20A of the second reinforcing reinforcement 20 is adhered to the inner wall end portion of the front wall reinforcing portion 18A of the first reinforcing reinforcement 18, and the superposed portion 20B of the second reinforcing reinforcement 20 is adhered to the inner wall end portion of the rear wall reinforcing portion 18C of the first reinforcing reinforcement 18. Note that the second reinforcing reinforcement 20 is molded as a single part before the process of FIG. 3B.

Figure 3C:
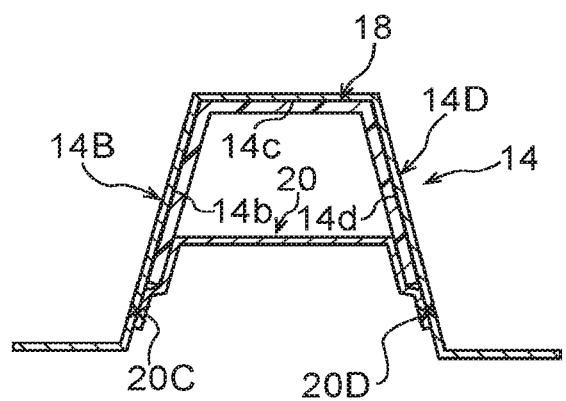
FIG. 3C is a process diagram showing one step of the other method of manufacturing the center pillar of FIG. 1 (a step in which the first reinforcing reinforcement is adhered to the outer reinforcement and the mounting portions of the second reinforcing reinforcement are welded to the outer reinforcement).
Figure 3D:
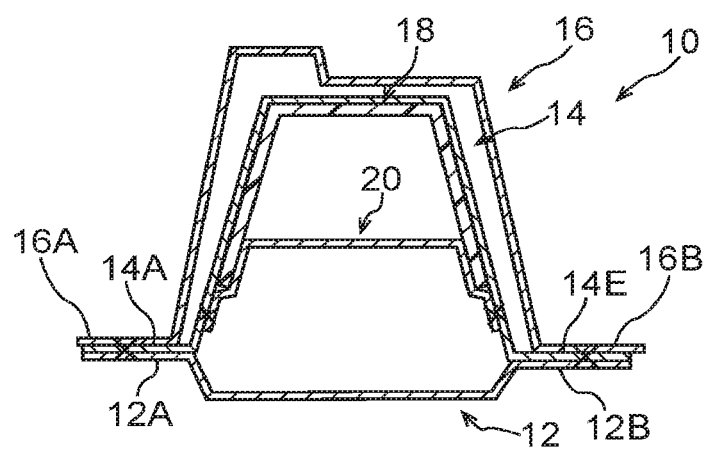
FIG. 3D is a process diagram showing one step of the other method of manufacturing the center pillar of FIG. 1 (a step in which the flange portions of the inner panel, the flange portions of the outer reinforcement, and the flange portions of the side outer panel are superposed as three layers and welded).

Next, as shown in FIG. 3C, the first reinforcing reinforcement 18 is adhered to the inner wall surfaces 14b, 14c, 14d of the outer reinforcement 14. Further, the mounting portion 20C of the second reinforcing reinforcement 20 is joined by spot welding to the inner wall surface 14b of the front wall portion 14B of the outer reinforcement 14, and the mounting portion 20D of the second reinforcing reinforcement 20 is joined by spot welding to the inner wall surface 14d of the rear wall portion 14D of the outer reinforcement 14. Further, finally, as shown in FIG. 3D, the front flange portion 12A of the inner panel 12, the front flange portion 14A of the outer reinforcement 14, and the front flange portion 16A of the side outer panel 16 are spot welded in a state of being superposed in three layers, and the rear flange portion 12B of the inner panel 12, the rear flange portion 14E of the outer reinforcement 14, and the rear flange portion 16B of the side outer panel 16 are spot welded in a state of being superposed in three layers. Due thereto, the assembly of the center pillar 10 is manufactured.

(Operation/Effects)

Operation and effects of the above-described embodiment are described next.

As shown in FIG. 1, the first reinforcing reinforcement 18 is continuously superposed with and adhered to the inner wall surface 14b of the front wall portion 14B, the inner wall surface 14c of the outer wall portion 14C, and the inner wall surface 14d of the rear wall portion 14D at the outer reinforcement 14. Therefore, the front wall portion 14B, the outer wall portion 14C, and the rear wall portion 14D at the outer reinforcement 14 are reinforced by the first reinforcing reinforcement 18.

On the other hand, there are cases in which, due to load input at the time of a side collision, the front wall portion 14B and the rear wall portion 14D of the outer reinforcement 14 deform so as to, for example, curve toward the inner sides in the directions in which they face one another as seen in a horizontal sectional view. At this time, load, that attempts to peel the vehicle transverse direction inner side end portions of the first reinforcing reinforcement 18 apart from the front wall portion 14B and the rear wall portion 14D, is applied to the adhesion boundary surface.

To address this, at the second reinforcing reinforcement 20, the superposed portion 20A at the front side is superposed via the first reinforcing reinforcement 18 with the inner wall surface 14b of the front wall portion 14B of the outer reinforcement 14, and the superposed portion 20B at the rear side is superposed via the first reinforcing reinforcement 18 with the inner wall surface 14d of the rear wall portion 14D of the outer reinforcement 14. Further, at the second reinforcing reinforcement 20, the mounting portion 20C at the front side is connected in the form of a step to the superposed portion 20A, and is directly joined to the front wall portion 14B at the outer reinforcement 14, and the mounting portion 20D at the rear side is connected in the form of a step to the superposed portion 20B, and is directly joined to the rear wall portion 14D at the outer reinforcement 14, and moreover, the connecting portion 20E connects the end portions at the vehicle transverse direction outer sides (the sides opposite the mounting portion 20C, 20D sides) of the pair of superposed portions 20A, 20B. In this way, the second reinforcing reinforcement 20 nips the first reinforcing reinforcement 18 in between the second reinforcing reinforcement 20 and the front wall portion 14B and the rear wall portion 14D of the outer reinforcement 14, while the both end sides of the second reinforcing reinforcement 20 are directly joined to the outer reinforcement 14 (the front wall portion 14B and the rear wall portion 14D). Therefore, even if the front wall portion 14B and the rear wall portion 14D of the outer reinforcement 14 deform so as to, for example, curve toward the inner sides in the directions of facing one another as seen in a horizontal sectional view, the first reinforcing reinforcement 18 can be made to follow the respective deformations of the front wall portion 14B and the rear wall portion 14D of the outer reinforcement 14 at the elastic deformation regions thereof. Due thereto, in a case in which load is inputted to the outer reinforcement 14, the input load is effectively transmitted to the first reinforcing reinforcement 18, and further, peeling-apart of the first reinforcing reinforcement 18 from the outer reinforcement 14 also is prevented or suppressed.

Further, in the present embodiment, the vehicle front side region at the second reinforcing reinforcement 20 is bent in the shape of a crank along the step portion 24A that is formed by the inner wall surface 14b of the front wall portion 14B of the outer reinforcement 14 and the front wall reinforcing portion 18A of the first reinforcing reinforcement 18. Namely, the mounting portion 20C at the vehicle front side of the second reinforcing reinforcement 20 is supported by the front wall portion 14B of the outer reinforcement 14 at a position adjacent to the final end portion of the front wall reinforcing portion 18A of the first reinforcing reinforcement 18. Therefore, the holding force by which the second reinforcing reinforcement 20 holds the final end portion of the front wall reinforcing portion 18A of the first reinforcing reinforcement 18 is increased. Further, at the time of input of load to the outer reinforcement 14, the final end portion of the front wall reinforcing portion 18A of the first reinforcing reinforcement 18 can more stably be made to follow the deformation of the front wall portion 14B of the outer reinforcement 14. Accordingly, the performance of transmitting load to the front wall reinforcing portion 18A of the first reinforcing reinforcement 18 in a case in which load is inputted to the outer reinforcement 14 can be improved more. Further, peeling-apart of the final end portion of the front wall reinforcing portion 18A of the first reinforcing reinforcement 18 from the inner wall surface 14b of the front wall portion 14B of the outer reinforcement 14 is effectively prevented or suppressed.

Similarly, the vehicle rear side region at the second reinforcing reinforcement 20 is bent in the shape of a crank along the step portion 24B that is formed by the inner wall surface 14d of the rear wall portion 14D of the outer reinforcement 14 and the rear wall reinforcing portion 18C of the first reinforcing reinforcement 18. Namely, the mounting portion 20D at the vehicle rear side of the second reinforcing reinforcement 20 is supported by the rear wall portion 14D of the outer reinforcement 14 at a position adjacent to the final end portion of the rear wall reinforcing portion 18C of the first reinforcing reinforcement 18. Therefore, the holding force by which the second reinforcing reinforcement 20 holds the final end portion of the rear wall reinforcing portion 18C of the first reinforcing reinforcement 18 is increased. Further, at the time of input of load to the outer reinforcement 14, the final end portion of the rear wall reinforcing portion 18C of the first reinforcing reinforcement 18 can be more stably be made to follow the deformation of the rear wall portion 14D of the outer reinforcement 14. Accordingly, the performance of transmitting load to the rear wall reinforcing portion 18C of the first reinforcing reinforcement 18 in a case in which load is inputted to the outer reinforcement 14 can be improved more. Further, peeling-apart of the final end portion of the rear wall reinforcing portion 18C of the first reinforcing reinforcement 18 from the inner wall surface 14d of the rear wall portion 14D of the outer reinforcement 14 is effectively prevented or suppressed.

Further, in the present embodiment, the connecting portion 20E of the second reinforcing reinforcement 20 spans rectilinearly between the end portions at the vehicle transverse direction outer sides (the sides opposite the mounting portion 20C, 20D sides) at the pair of superposed portions 20A, 20B. Therefore, at the time of input of load to the outer reinforcement 14, in a case in which the front wall portion 14B and the rear wall portion 14D of the outer reinforcement 14 respectively deform, the first reinforcing reinforcement 18 is held between the second reinforcing reinforcement 20 and the front wall portion 14B of the outer reinforcement 14, and between the second reinforcing reinforcement 20 and the rear wall portion 14D of the outer reinforcement 14, respectively, also due to the tensed support of the connecting portion 20E of the second reinforcing reinforcement 20. Accordingly, the first reinforcing reinforcement 18 can more stably be made to follow deformation of the front wall portion 14B and the rear wall portion 14D of the outer reinforcement 14. Further, because the connecting portion 20E of the second reinforcing reinforcement 20, together with the first reinforcing reinforcement 18, forms the closed cross-section 26, cross-sectional deformation (cross-sectional collapsing) of the outer reinforcement 14 at the time of input of load to the outer reinforcement 14 is effectively suppressed. Due thereto, the respective deformation amounts of the front wall portion 14B and the rear wall portion 14D of the outer reinforcement 14 also are suppressed, and therefore, the first reinforcing reinforcement 18 following the respective deformations of the front wall portion 14B and the rear wall portion 14D of the outer reinforcement 14 becomes easy.

As described above, in accordance with the vehicle body reinforcing structure relating to the present embodiment, in a case in which load is inputted to the outer reinforcement 14, the input load can be effectively transmitted to the first reinforcing reinforcement 18. Further, in a case in which load is inputted to the outer reinforcement 14, the first reinforcing reinforcement 18 peeling-apart from the outer reinforcement 14 can be prevented or suppressed. As a result, the desired rigidity is obtained at the region that is reinforced by the first reinforcing reinforcement 18, and a decrease in the deformation load that is caused by peeling-apart of the adhesion of the first reinforcing reinforcement 18 is suppressed. Namely, the deformation load at the reinforced portion can be generated as per the inherent performance.

Figure 4:
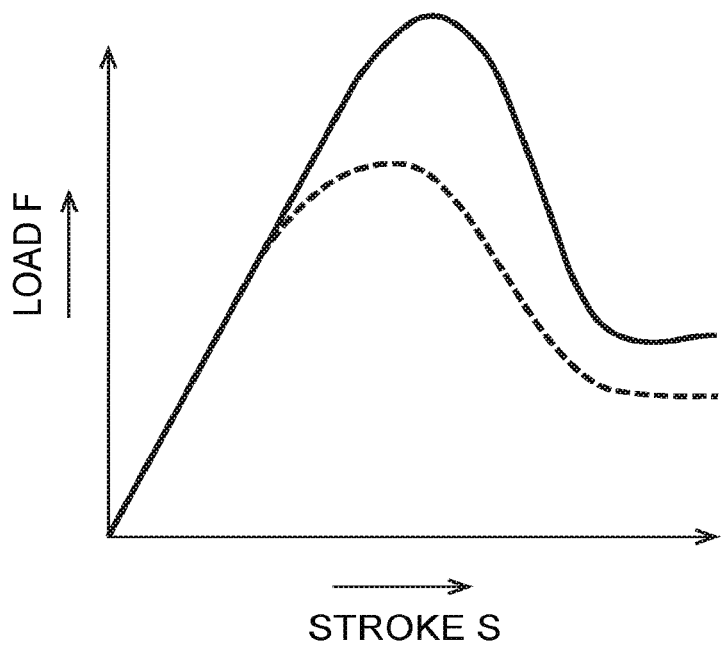
FIG. 4 is a graph showing the relationship between stroke and load at a time of input of load.

The F-S characteristic (load-stroke characteristic) is shown in FIG. 4. The solid line shows the characteristic in the case of the present embodiment, and the dashed line shows the characteristic in the case of a structure in which the second reinforcing reinforcement 20 is not provided (a comparative example). As shown in this graph, when a predetermined stroke is exceeded, load (reaction force) F becomes higher in the present embodiment than in the comparative example.

[Second Embodiment]

Figure 5:
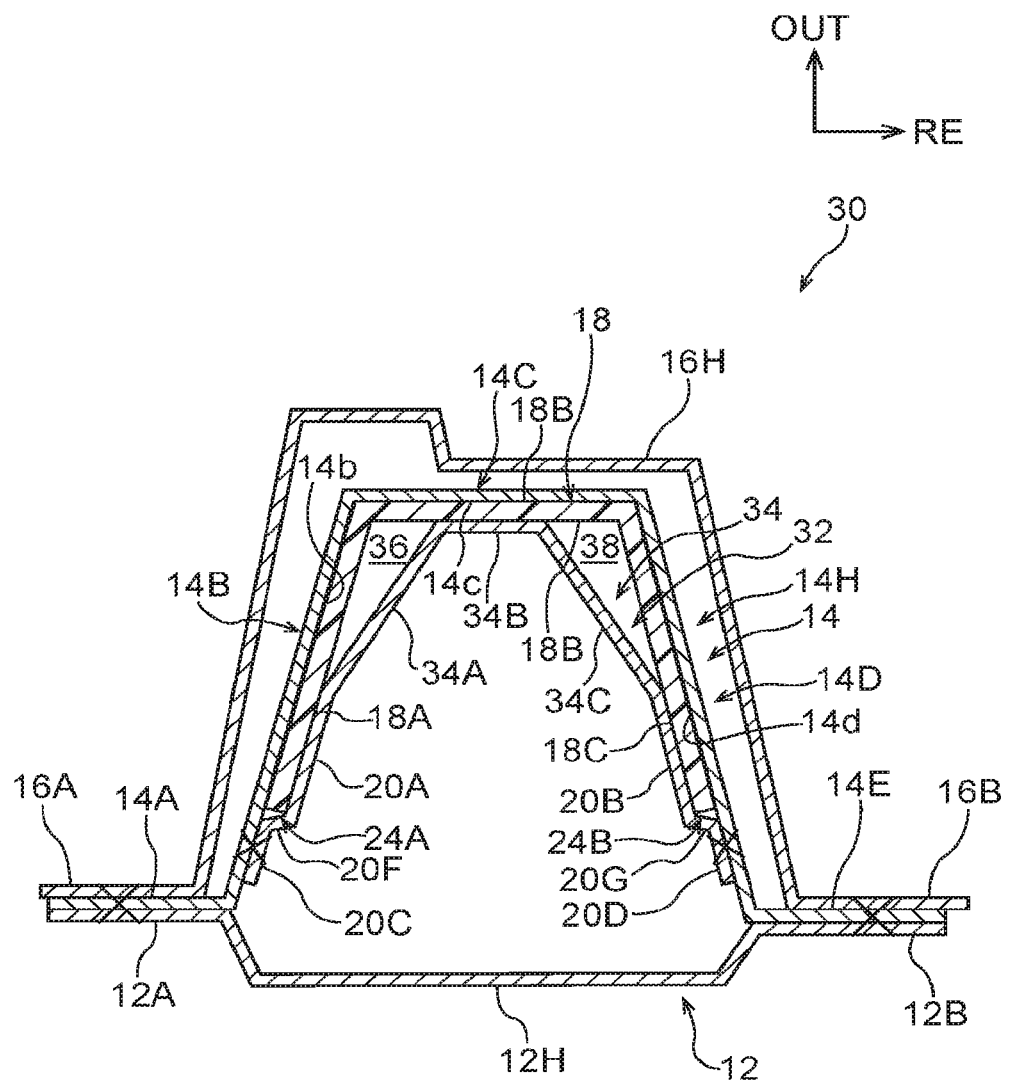
FIG. 5 is a horizontal sectional view showing a center pillar to which a vehicle body reinforcing structure relating to a second embodiment of the present invention is applied.

A vehicle body reinforcing structure relating to a second embodiment of the present invention is described next by using FIG. 5. A center pillar 30, to which the vehicle body reinforcing structure relating to the present embodiment is applied, is shown in FIG. 5 in a horizontal sectional view (a view corresponding to FIG. 1 of the first embodiment). As shown in this drawing, the center pillar 30 differs from the center pillar 10 relating to the first embodiment (see FIG. 1) with regard to the point that a second reinforcing reinforcement 32, that serves as a second reinforcing member and that is disposed in order to prevent peeling-apart of the first reinforcing reinforcement 18, has a connecting portion 34 instead of the connecting portion 20E (see FIG. 1). The other structures are configures that are similar to the first embodiment. Accordingly, the structural portions that are similar to those of the first embodiment are denoted by the same reference numerals, and description thereof is omitted.

As shown in FIG. 5, the connecting portion 34 connects the end portion at the vehicle transverse direction outer side (i.e., the side opposite the mounting portion 20C side) of the superposed portion 20A at the front side in the vehicle longitudinal direction, and the end portion at the vehicle transverse direction outer side (i.e., the side opposite the mounting portion 20D side) of the superposed portion 20B at the rear side in the vehicle longitudinal direction. The connecting portion 34 has an intermediate mating portion 34B that serves as a mating portion that is superposed, via the outer wall reinforcing portion 18B of the first reinforcing reinforcement 18, with a vehicle longitudinal direction intermediate portion of the inner wall surface 14c of the outer wall portion 14C of the outer reinforcement 14. This intermediate mating portion 34B is adhered to a vehicle longitudinal direction intermediate portion of the outer wall reinforcing portion 18B.

The connecting portion 34 has a bridging portion 34A that connects and spans between the end portion at the vehicle transverse direction outer side (i.e., the side opposite the mounting portion 20C side) of the superposed portion 20A at the front side, and the end portion at the vehicle front side of the intermediate mating portion 34B. As seen in a horizontal sectional view, the bridging portion 34A is inclined toward the vehicle rear side while heading toward the vehicle transverse direction outer side, and is disposed in a state of being taut between the front wall reinforcing portion 18A and the outer wall reinforcing portion 18B of the first reinforcing reinforcement 18. Further, the bridging portion 34A, together with the front wall reinforcing portion 18A and the outer wall reinforcing portion 18B of the first reinforcing reinforcement 18, forms a closed cross-section 36.

Further, the connecting portion 34 has a bridging portion 34C that connects and spans between the end portion at the vehicle transverse direction outer side (i.e., the side opposite the mounting portion 20D side) of the superposed portion 20B at the rear side, and the end portion at the vehicle rear side of the intermediate mating portion 34B. As seen in a horizontal sectional view, the bridging portion 34C is inclined toward the vehicle front side while heading toward the vehicle transverse direction outer side, and is disposed in a state being taut between the rear wall reinforcing portion 18C and the outer wall reinforcing portion 18B of the first reinforcing reinforcement 18. Further, the bridging portion 34C, together with the rear wall reinforcing portion 18C and the outer wall reinforcing portion 18B of the first reinforcing reinforcement 18, forms a closed cross-section 38.

In accordance with the vehicle body reinforcing structure relating to the present embodiment as well, in a case in which load is inputted to the outer reinforcement 14, the input load can be effectively transmitted to the first reinforcing reinforcement 18. Further, in a case in which load is inputted to the outer reinforcement 14, the first reinforcing reinforcement 18 peeling-apart from the outer reinforcement 14 can be prevented or suppressed. As a result, the deformation load at the reinforced portion can be generated as per the inherent performance.

Further, in the present embodiment, the first reinforcing reinforcement 18 is nipped also between the outer wall portion 14C of the outer reinforcement 14 and the intermediate mating portion 34B of the second reinforcing reinforcement 32. Therefore, at the time of input of load to the outer reinforcement 14, the first reinforcing reinforcement 18 can stably be made to follow the deformation of the outer wall portion 14C of the outer reinforcement 14 at the elastic deformation region thereof. Accordingly, the performance of transmitting load to the first reinforcing reinforcement 18 in a case in which load is inputted to the outer reinforcement 14 can be improved.

Further, in the present embodiment, at the time of input of load to the outer reinforcement 14, cross-sectional deformation (cross-sectional collapsing) of the outer reinforcement 14 is effectively suppressed due to the bridging portions 34A, 34C of the second reinforcing reinforcement 32 tensingly supporting the outer reinforcement 14. Further, cross-sectional deformation (cross-sectional collapsing) of the outer reinforcement 14 is effectively suppressed also due to the closed cross-sections 36, 38 being formed by the first reinforcing reinforcement 18 and the bridging portions 34A, 34C of the second reinforcing reinforcement 32. Due thereto, the deformation amount of the outer reinforcement 14 also is suppressed, and therefore, the first reinforcing reinforcement 18 following the deformation of the outer reinforcement 14 becomes easy.

[Third Embodiment]

Figure 6:
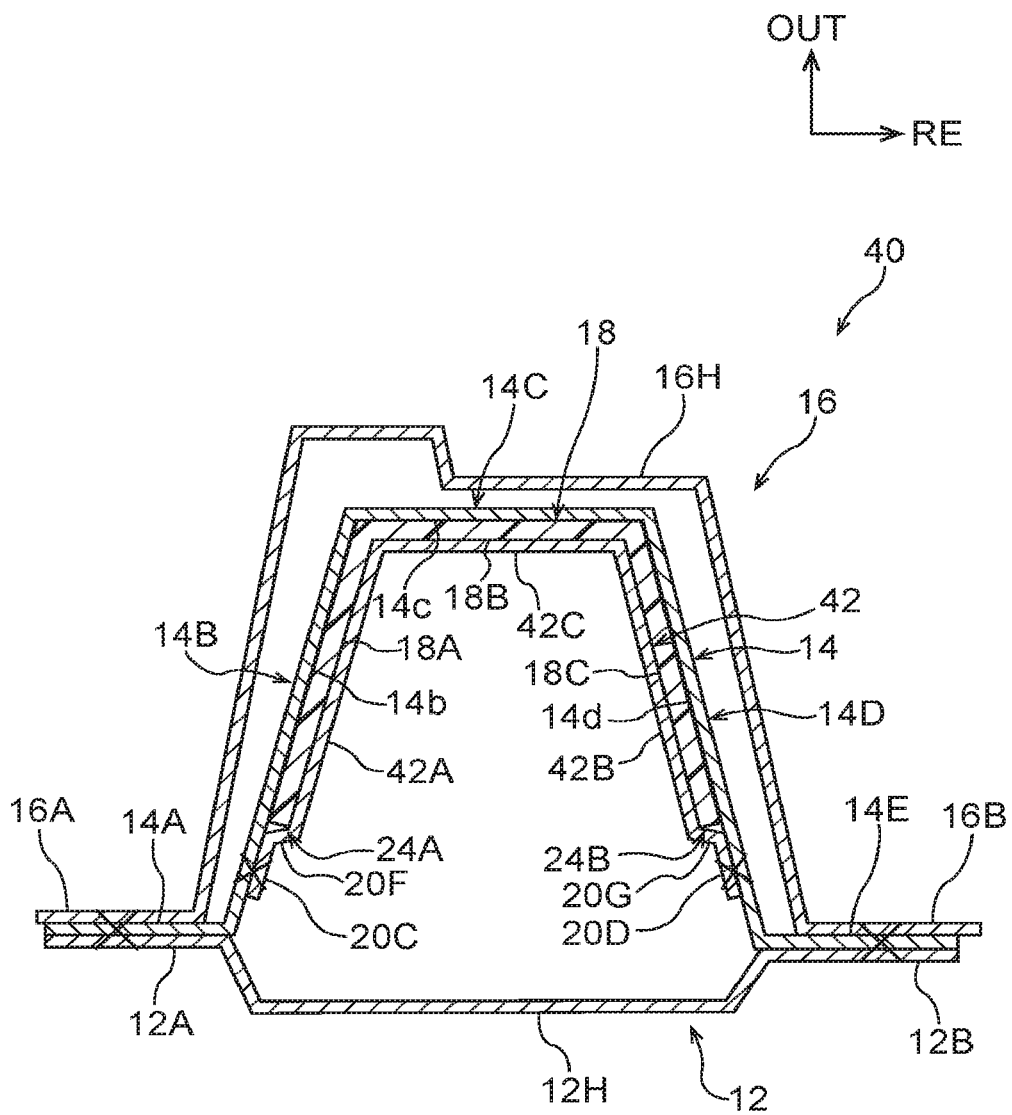
FIG. 6 is a horizontal sectional view showing a center pillar to which a vehicle body reinforcing structure relating to a third embodiment of the present invention is applied.

A vehicle body reinforcing structure relating to a third embodiment of the present invention is described next by using FIG. 6. A center pillar 40, to which the vehicle body reinforcing structure relating to the present embodiment is applied, is shown in FIG. 6 in a horizontal sectional view (a view corresponding to FIG. 1 of the first embodiment). As shown in this drawing, at the center pillar 40, the structure of the portion at the vehicle transverse direction outer side of a second reinforcing reinforcement 42 that serves as a second reinforcing member differs from the structure of the portion at the vehicle transverse direction outer side of the second reinforcing reinforcement 20 (see FIG. 1) of the first embodiment. The other structures are configures that are similar to the first embodiment. Accordingly, the structural portions that are similar to those of the first embodiment are denoted by the same reference numerals, and description thereof is omitted.

As shown in FIG. 6, the second reinforcing reinforcement 42 is for preventing peeling-apart of the first reinforcing reinforcement 18, and has a pair of front and rear superposed portions 42A, 42B that are superposed with the outer reinforcement 14 via the first reinforcing reinforcement 18. As compared with the pair of front and rear superposed portions 20A, 20B (see FIG. 1) in the first embodiment, the range over which the pair of front and rear superposed portions 42A, 42B overlap the first reinforcing reinforcement 18 as seen in a horizontal sectional view is set to be wide.

As seen in a horizontal sectional view, the superposed portion 42A at the front side in the vehicle longitudinal direction is provided so as to correspond to the entire region of the inner wall surface of the front wall reinforcing portion 18A of the first reinforcing reinforcement 18, and is superposed with the inner wall surface 14b of the front wall portion 14B of the outer reinforcement 14 via the front wall reinforcing portion 18A of the first reinforcing reinforcement 18. This superposed portion 42A is adhered to the front wall reinforcing portion 18A. The superposed portion 42A and the mounting portion 20C are connected in the form of a step by the inclined wall portion 20F. Further, as seen in a horizontal sectional view, the superposed portion 42B at the rear side in the vehicle longitudinal direction is provided so as to correspond to the entire region of the inner wall surface of the rear wall reinforcing portion 18C of the first reinforcing reinforcement 18, and is superposed with the inner wall surface 14d of the rear wall portion 14D of the outer reinforcement 14 via the rear wall reinforcing portion 18C of the first reinforcing reinforcement 18. This superposed portion 42B is adhered to the rear wall reinforcing portion 18C. The superposed portion 42B and the mounting portion 20D are connected in the form of a step by the inclined wall portion 20G Further, the second reinforcing reinforcement 42 has a connecting portion 42C that connects the end portion at the vehicle transverse direction outer side (i.e., the side opposite the mounting portion 20C side) of the superposed portion 42A that is at the vehicle longitudinal direction front side, and the end portion at the vehicle transverse direction outer side (i.e., the side opposite the mounting portion 20D side) of the superposed portion 42B that is at the vehicle longitudinal direction rear side. As seen in a horizontal sectional view, the connecting portion 42C that serves as a mating portion is provided so as to correspond to the entire region of the inner wall surface of the outer wall reinforcing portion 18B of the first reinforcing reinforcement 18, and is superposed, via the outer wall reinforcing portion 18B of the first reinforcing reinforcement 18, with the inner wall surface 14c of the outer wall portion 14C of the outer reinforcement 14. This connecting portion 42C is adhered to the outer wall reinforcing portion 18B.

In accordance with the vehicle body reinforcing structure relating to the present embodiment as well, in a case in which load is inputted to the outer reinforcement 14, input load can be effectively transmitted to the first reinforcing reinforcement 18. Further, in a case in which load is inputted to the outer reinforcement 14, peeling-apart of the first reinforcing reinforcement 18 from the outer reinforcement 14 can be prevented or suppressed. As a result, the deformation load at the reinforced portion can be generated as per the inherent performance.

Further, in the present embodiment, in the same way as in the second embodiment, at the time of input of load to the outer reinforcement 14, the first reinforcing reinforcement 18 can stably be made to follow the deformation of the outer wall portion 14C of the outer reinforcement 14 at the elastic deformation region thereof. Accordingly, the performance of transmitting load to the first reinforcing reinforcement 18 in a case in which load is inputted to the outer reinforcement 14 can be improved.

[Fourth Embodiment]

Figure 7:
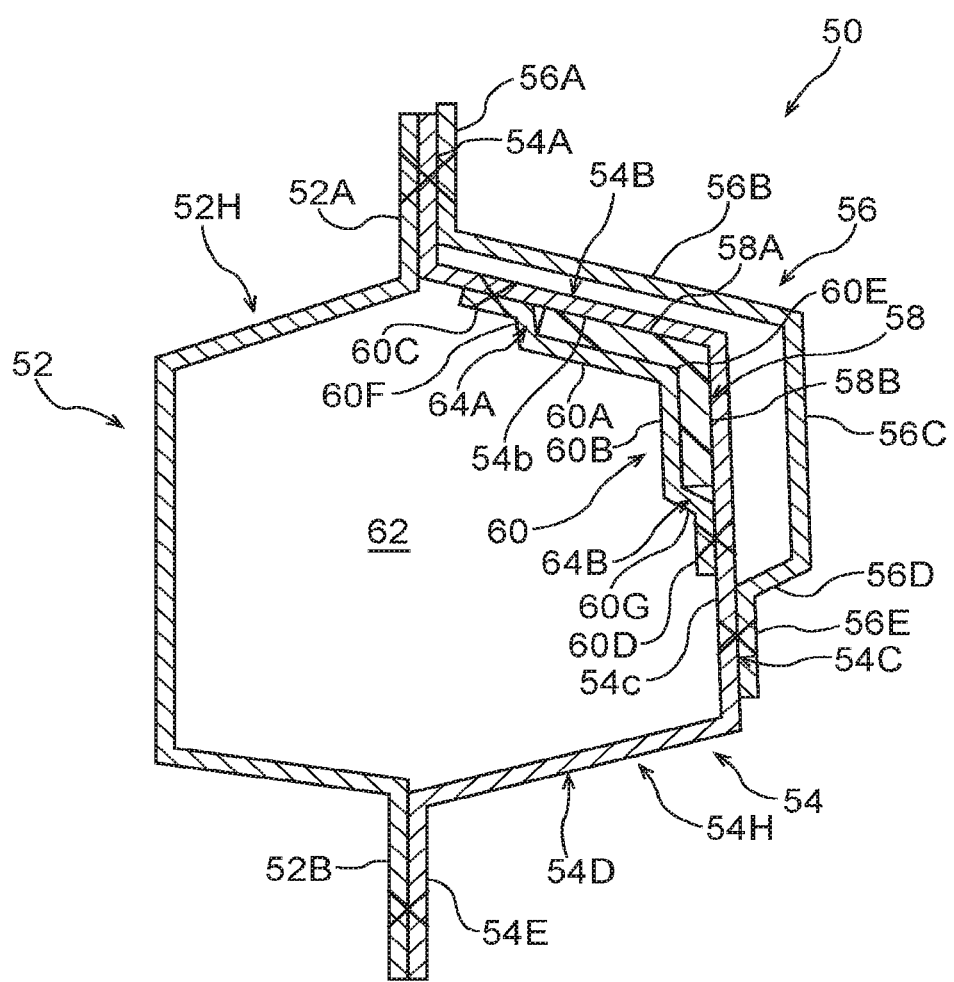
FIG. 7 is a vertical sectional view showing a rocker to which a vehicle body reinforcing structure relating to a fourth embodiment of the present invention is applied.

A vehicle body reinforcing structure relating to a fourth embodiment of the present invention is described next by using FIG. 7. A rocker 50 (also called "side sill"), to which the vehicle body reinforcing structure relating to the present embodiment is applied, is shown in FIG. 7 in a vertical sectional view seen from the vehicle front. Note that, in FIG. 7, arrow UP indicates the vehicle upper side, and arrow OUT indicates the vehicle transverse direction outer side.

As shown in FIG. 7, the rocker 50 has an inner panel 52 that is made of metal (made of steel in the present embodiment) and configures the region at the vehicle transverse direction inner side of the rocker 50. The inner panel 52 is formed in the shape of a hat that opens toward the vehicle transverse direction outer side as seen in a vehicle front view, and has a main body portion 52H that is substantially U-shaped and that opens toward the vehicle transverse direction outer side as seen in a vehicle front view. An upper flange portion 52A, that is bent and extends-out toward the vehicle upper side, is formed from the opening upper end portion of this main body portion 52H. A lower flange portion 52B, that is bent and extends-out toward the vehicle lower side, is formed from the opening lower end portion of the main body portion 52H.

Further, the rocker 50 has an outer reinforcement 54 that serves as a vehicle body structural member, and that is made of metal (made of steel in the present embodiment) and that, together with the inner panel 52, forms a closed cross-section 62. The outer reinforcement 54 is formed in the shape of a hat that opens toward the vehicle transverse direction inner side as seen in a vehicle front view, and has a main body portion 54H that is substantially U-shaped and opens toward the vehicle transverse direction inner side as seen in a vehicle front view.

The main body portion 54H has a side wall portion 54C that serves as a first wall portion and configures the vehicle transverse direction outer side region. The surfaces of the side wall portion 54C face in the vehicle transverse direction. An upper wall portion 54B and a lower wall portion 54D, that serve as a pair of second wall portions and are bent and extend-out toward sides of facing one another, are formed from the both end portions in the vehicle vertical direction of the side wall portion 54C. The upper wall portion 54B is inclined slightly toward the vehicle upper side while heading toward the vehicle transverse direction inner side, and the lower wall portion 54D is inclined slightly toward the vehicle lower side while heading toward the vehicle transverse direction inner side.

An upper flange portion 54A, that is bent and extends-out toward the vehicle upper side, is formed from the vehicle transverse direction inner side end portion of the upper wall portion 54B of this main body portion 54H. Further, a lower flange portion 54E, that is bent and extends-out toward the vehicle lower side, is formed from the vehicle transverse direction inner side end portion of the lower wall portion 54D of the main body portion 54H.

Further, a portion of a side outer panel (also called a "side member outer") 56 that is made of metal (is made of steel in the present embodiment) is disposed at the vehicle transverse direction outer side of the outer reinforcement 54. The side outer panel 56 has an upper wall portion 56B that covers the upper wall portion 54B of the outer reinforcement 54, and a side wall portion 56C that covers the upper portion and a vertical direction intermediate portion of the side wall portion 54C from the vehicle transverse direction outer side. An upper flange portion 56A, that is bent and extends-out toward the vehicle upper side, is formed from the vehicle transverse direction inner side end portion of the upper wall portion 56B. Further, a lower wall portion 56D, that is bent and inclined obliquely toward the vehicle transverse direction inner side and lower side, is formed from the lower end portion of the side wall portion 56C. A lower flange portion 56E, that is bent and extends-out toward the vehicle lower side, is formed from the vehicle transverse direction inner side end portion of the lower wall portion 56D.

The upper flange portion 52A of the inner panel 52, the upper flange portion 54A of the outer reinforcement 54, and the upper flange portion 56A of the side outer panel 56 are spot welded in a state of being superposed in three layers. Further, the lower flange portion 52B of the inner panel 52 and the lower flange portion 54E of the outer reinforcement 54 are spot welded in a state of being superposed in two layers. Moreover, the side wall portion 54C of the outer reinforcement 54 and the lower flange portion 56E of the side outer panel 56 are spot welded in a state of being superposed in two layers. Due thereto, the three members that are the inner panel 52, the outer reinforcement 54, and the side outer panel 56 are made integral.

A first reinforcing reinforcement 58 that serves as a first reinforcing member is disposed at the inner side of the main body portion 54H of the outer reinforcement 54. The first reinforcing reinforcement 58 is a member that is shaped as a bent plate that is bent in a V-shape, and is formed integrally of a fiber reinforced resin material (a composite material (FRP) that is formed by fibers (e.g., carbon fibers) being solidified in resin). The first reinforcing reinforcement 58 is continuously superposed with and adhered to an inner wall surface 54b of the upper wall portion 54B and an inner wall surface 54c of the side wall portion 54C of the outer reinforcement 54. In other words, in the present embodiment, the inner wall surface 54b of the upper wall portion 54B and the inner wall surface 54c of the side wall portion 54C of the outer reinforcement 54 correspond to end wall surfaces that configure the both end sides (i.e., both because there are the two inner wall surfaces 54b, 54c in the present embodiment) of the two continuous inner wall surfaces 54b, 54c at the outer reinforcement 54 that are superposed by the first reinforcing reinforcement 58.

The first reinforcing reinforcement 58 has an upper wall reinforcing portion 58A that is adhered to the inner wall surface 54b of the upper wall portion 54B of the outer reinforcement 54 in a planarly-contacting state. The upper wall reinforcing portion 58A is superposed with the vehicle transverse direction outer side region of the upper wall portion 54B. Therefore, a step portion 64A is formed between the region where the first reinforcing reinforcement 58 (the upper wall reinforcing portion 58A) is superposed with the inner wall surface 54b of the upper wall portion 54B of the outer reinforcement 54, and the region where the first reinforcing reinforcement 58 is not superposed with the inner wall surface 54*b* of the upper wall portion 54B of the outer reinforcement 54.

Further, the first reinforcing reinforcement 58 has a side wall reinforcing portion 58B that is bent and extends-out toward the vehicle lower side from the vehicle transverse direction outer side end portion of the upper wall reinforcing portion 58A. The side wall reinforcing portion 58B is adhered to the inner wall surface 54*c* of the side wall portion 54C of the outer reinforcement 54 in a planarly contacting state, and is superposed with the upper portion of the inner surface of the side wall portion 54C. Therefore, a step portion 64B is formed between the region where the first reinforcing reinforcement 58 (the side wall reinforcing portion 58B) is superposed with the inner wall surface 54*c* of the side wall portion 54C of the outer reinforcement 54, and the region where the first reinforcing reinforcement 58 is not superposed with the inner wall surface 54*c* of the side wall portion 54C of the outer reinforcement 54.

Further, a second reinforcing reinforcement 60, that serves as a second reinforcing member and is made of metal (made of steel in the present embodiment), is disposed at the inner side of the main body portion 54H of the outer reinforcement 54, in addition to the first reinforcing reinforcement 58. The second reinforcing reinforcement 60 is for preventing peeling-apart of the first reinforcing reinforcement 58, and has a pair of superposed portions 60A, 60B that are superposed with the outer reinforcement 54 via the first reinforcing reinforcement 58.

As seen in the cross-sectional view of FIG. 7, the one superposed portion 60A is provided so as to correspond to the entire region of the inner wall surface of the upper wall reinforcing portion 58A of the first reinforcing reinforcement 58, and is superposed, via the upper wall reinforcing portion 58A of the first reinforcing reinforcement 58, with the vehicle transverse direction outer side region of the inner wall surface 54*b* of the upper wall portion 54B of the outer reinforcement 54. This superposed portion 60A is adhered to the upper wall reinforcing portion 58A.

As seen in the cross-sectional view of FIG. 7, the other superposed portion 60B is provided so as to correspond to the entire region of the inner wall surface of the side wall reinforcing portion 58B of the first reinforcing reinforcement 58, and is superposed, via the side wall reinforcing portion 58B of the first reinforcing reinforcement 58, with the vehicle upper side region of the inner wall surface 54*c* of the side wall portion 54C of the outer reinforcement 54. This superposed portion 60B is adhered to the side wall reinforcing portion 58B.

The region at the vehicle upper side and the vehicle transverse direction inner side of the second reinforcing reinforcement 60 is bent in the shape of a crank along the step portion 64A, and has a mounting portion 60C that is connected in the form of a step to the superposed portion 60A. The mounting portion 60C is directly superposed with the inner wall surface 54*b* of the upper wall portion 54B of the outer reinforcement 54, and is joined by spot welding to the upper wall portion 54B of the outer reinforcement 54. The vehicle transverse direction inner side end portion of the superposed portion 60A and the vehicle transverse direction outer side end portion of the mounting portion 60C are connected by an inclined wall portion 60F that is inclined slightly toward the vehicle transverse direction inner side while heading toward the vehicle upper side.

The region at the vehicle lower side of the second reinforcing reinforcement 60 also is bent in the shape of a crank along the step portion 64B, and has a mounting portion 60D that is connected in the form of a step to the superposed portion 60B. The mounting portion 60D is directly superposed with the inner wall surface 54*c* of the side wall portion 54C of the outer reinforcement 54, and is joined by spot welding to the side wall portion 54C of the outer reinforcement 54. The vehicle lower side end portion of the superposed portion 60B and the vehicle upper side end portion of the mounting portion 60D are connected by an inclined wall portion 60G that is inclined slightly toward the lower side while heading toward the vehicle transverse direction outer side.

Further, the second reinforcing reinforcement 60 has a connecting portion 60E that connects the end portion at the vehicle transverse direction outer side (i.e., the side opposite the mounting portion 60C side) of the superposed portion 60A, and the end portion at the vehicle upper side (i.e., the side opposite the mounting portion 60D side) of the superposed portion 60B. The connecting portion 60E is made to be a bending point in the present embodiment.

(Operation/Effects)

Operation and effects of the above-described embodiment are described next.

In the present embodiment, the first reinforcing reinforcement 58 is continuously superposed with and adhered to the inner wall surface 54*b* of the top wall portion 54B and the inner wall surface 54*c* of the side wall portion 54C of the outer reinforcement 54. Therefore, the upper wall portion 54B and the side wall portion MC of the outer reinforcement 54 are reinforced by the first reinforcing reinforcement 58.

On the other hand, there are cases in which, due to load input at the time of a side collision, for example, the upper wall portion 54B and the side wall portion 54C of the outer reinforcement 54 deform. At this time, load, that attempts to peel the end portions of the first reinforcing reinforcement 58 apart from the upper wall portion 54B and the side wall portion 54C, is applied to the adhesion boundary surface.

With respect thereto, in the present embodiment, the one superposed portion 60A of the second reinforcing reinforcement 60 is superposed, via the first reinforcing reinforcement 58, with the inner wall surface 54*b* of the upper wall portion 54B of the outer reinforcement 54, and the other superposed portion 60B of the second reinforcing reinforcement 60 is superposed, via the first reinforcing reinforcement 58, with the inner wall surface 54*c* of the side wall portion 54C of the outer reinforcement 54. Further, at the second reinforcing reinforcement 60, the one mounting portion 60C is connected in the form of a step to the superposed portion 60A, and is directly joined to the upper wall portion 54B at the outer reinforcement 54, and the other mounting portion 60D is connected in the form of a step to the superposed portion 60B, and is directly joined to the side wall portion 54C at the outer reinforcement 54, and, moreover, the connecting portion 60E connects the end portions, that are at the sides opposite the mounting portion 60C, 60D sides, at the pair of superposed portions 60A, 60B. In this way, the second reinforcing reinforcement 60 nips the first reinforcing reinforcement 58 in between the second reinforcing reinforcement 60 and the upper wall portion MB of the outer reinforcement 54, and between the second reinforcing reinforcement 60 and the side wall portion 54C of the outer reinforcement 54, while the both end sides of the second reinforcing reinforcement 60 are directly joined to the outer reinforcement 54 (the upper wall portion 5413 and the side wall portion 54C). Therefore, even if the upper wall portion 54B and the side wall portion 54C at the outer reinforcement 54 respectively deform due to load input for example, the first reinforcing reinforcement 58 can be made to follow the respective deformations of the upper wall portion 54B and the side wall portion 54C of the outer reinforcement 54 at the elastic deformation regions thereof.

Further, in the present embodiment, the vehicle upper side and vehicle transverse direction inner side region of the second reinforcing reinforcement 60 is bent in the shape of a crank along the step portion 64A that is formed by the inner wall surface 54*b* of the upper wall portion 54B of the outer reinforcement 54 and the upper wall reinforcing portion 58A of the first reinforcing reinforcement 58. Namely, the mounting portion 60C at the vehicle upper side of the second reinforcing reinforcement 60 is supported by the upper wall portion 54B of the outer reinforcement 54 at a position adjacent to the final end portion of the upper wall reinforcing portion 58A of the first reinforcing reinforcement 58. Therefore, the holding force by which the second reinforcing reinforcement 60 holds the final end portion of the upper wall reinforcing portion 58A of the first reinforcing reinforcement 58 is increased. Further, at the time of input of load to the outer reinforcement 54, the final end portion of the upper wall reinforcing portion 58A of the first reinforcing reinforcement 58 can more stably be made to follow the deformation of the upper wall portion 54B of the outer reinforcement 54. Accordingly, the performance of transmitting load to the upper wall reinforcing portion 58A of the first reinforcing reinforcement 58 in a case in which load is inputted to the outer reinforcement 54 can be improved more. Further, peeling-apart of the final end portion of the upper wall reinforcing portion 58A of the first reinforcing reinforcement 58 from the inner wall surface 54*b* of the upper wall portion 54B of the outer reinforcement 54 is effectively prevented or suppressed.

Similarly, the vehicle lower side region of the second reinforcing reinforcement 60 is bent in the shape of a crank along the step portion 64B that is formed by the inner wall surface 54*c* of the side wall portion 54C of the outer reinforcement 54 and the side wall reinforcing portion 58B of the first reinforcing reinforcement 58. Namely, the mounting portion 60D at the vehicle lower side of the second reinforcing reinforcement 60 is supported by the side wall portion 54C of the outer reinforcement 54 at a position adjacent to the final end portion of the side wall reinforcing portion 58B of the first reinforcing reinforcement 58. Therefore, the holding force by which the second reinforcing reinforcement 60 holds the final end portion of the side wall reinforcing portion 58B of the first reinforcing reinforcement 58 is increased. Further, at the time of input of load to the outer reinforcement 54, the final end portion of the side wall reinforcing portion 58B of the first reinforcing reinforcement 58 can more stably be made to follow the deformation of the side wall portion 54C of the outer reinforcement 54. Accordingly, the performance of transmitting load to the side wall reinforcing portion 58B of the first reinforcing reinforcement 58 in a case in which load is inputted to the outer reinforcement 54 can be improved more. Further, peeling-apart of the final end portion of the side wall reinforcing portion 58B of the first reinforcing reinforcement 58 from the side wall surface 54*c* of the side wall portion 54C of the outer reinforcement 54 is effectively prevented or suppressed.

As described above, in accordance with the vehicle body reinforcing structure relating to the present embodiment, in a case in which load is inputted to the outer reinforcement 54, the input load can be effectively transmitted to the first reinforcing reinforcement 58. Further, in a case in which load is inputted to the outer reinforcement 54, the first reinforcing reinforcement 58 peeling-apart from the outer reinforcement 54 can be prevented or suppressed. As a result, the desired rigidity is obtained at the region that is reinforced by the first reinforcing reinforcement 58.

[Supplementary Description of Embodiments]

Note that, in the above-described embodiments, the second reinforcing reinforcement 20, 32, 42, 60 and a vehicle body structural member (the outer reinforcement 14 in the first through third embodiments, and the outer reinforcement 54 in the fourth embodiment) are welded. However, these may be joined by mechanical jointing such as fastening by bolts or the like. Further, in the above-described embodiments, the second reinforcing reinforcement 20, 32, 42, 60 is made of metal, but the second reinforcing member can be made to be a reinforcing member that is made of resin.

Further, in the above-described embodiments, the first reinforcing reinforcement 18, 58 and the second reinforcing reinforcement 20, 32, 42, 60 are adhered, but a structure in which the both are not adhered can be employed.

Further, in the above-described embodiments, the second reinforcing reinforcement 20, 32, 42, 60 is bent in the shape of a crank along the step portion 24A, 24B, 64A, 64B. However, at the second reinforcing reinforcement that serves as the second reinforcing member, it is also possible to employ a structure in which, for example, the mounting portions (20C, 20D, 60C, 60D) are set at positions that are apart by a certain extent from the final end portions of the first reinforcing reinforcement (18, 58).

Note that the concept of "along step portions" that is recited in the second aspect of the present invention includes, in addition to cases in which the second reinforcing member is disposed in a state in which there are no gaps between the second reinforcing member and the step portions, also cases in which, even if slight gaps are formed between the second reinforcing member and the step portions 24A, 24B, 64A, 64B as in the above-described embodiments, the second reinforcing member runs along the step portions when viewed on the whole, and operation and effects, that are approximately similar to those in a case in which the second reinforcing member is disposed in a state in which there are no gaps between the second reinforcing member and the step portions, are obtained.

Note that the above-described embodiments and the above-described plural modified examples can be implemented by being combined appropriately.

Further, although examples of the present invention have been described above, the present invention is not limited to the above, and, of course, can be implemented by being modified in various ways, other than the above, within a scope that does not depart from the gist thereof.

The disclosure of Japanese Patent Application No. 2013-202606 is, in its entirety, incorporated by reference into the present specification.

The invention claimed is:

1. A vehicle body reinforcing structure comprising:
a vehicle body structural member that is made of metal, the vehicle body structural member having a first wall portion, and a pair of second wall portions that are bent from both end portions of the first wall portion and extend-out toward sides facing one another;
a first reinforcing member that is bent-plate-shaped, the first reinforcing member being disposed at an inner side of the vehicle body structural member, the first reinforcing member being formed integrally of a fiber reinforced resin material, and the first reinforcing member being continuously superposed with and adhered to at least two inner wall surfaces that are continuous at the vehicle body structural member; and a second reinforcing member that has a pair of superposed portions, a pair of mounting portions, and a connecting portion, the pair of superposed portions being disposed at the inner side of the vehicle body structural member and superposed, via the first reinforcing member, with end wall surfaces that structure both end sides of the at least two inner wall surfaces that are continuous, the pair of mounting portions being connected in forms of steps to the superposed portions and directly joined to wall portions that structure the end wall surfaces, and the connecting portion connecting end portions, at sides opposite the mounting portion sides, of the pair of superposed portions.

2. The vehicle body reinforcing structure of claim 1, wherein the second reinforcing member is bent in shapes of cranks along step portions, the step portions being formed between regions where the first reinforcing member is superposed with the end wall surfaces and regions where the first reinforcing member is not superposed with the end wall surfaces.

3. The vehicle body reinforcing structure of claim 1, wherein
the first reinforcing member is continuously superposed with and adhered to three inner wall surfaces that are continuous at the vehicle body structural member, and
the connecting portion spans in a rectilinear form between the end portions, at the sides opposite the mounting portion sides, of the pair of superposed portions, and forms a closed cross-section together with the first reinforcing member.

4. The vehicle body reinforcing structure of claim 1, wherein
the first reinforcing member is continuously superposed with and adhered to three inner wall surfaces that are continuous at the vehicle body structural member, and
the connecting portion has a mating portion that is superposed, via the first reinforcing member, with the inner wall surface of the first wall portion.

* * * * *